United States Patent [19]

Gidon et al.

[11] Patent Number: 5,359,279
[45] Date of Patent: Oct. 25, 1994

[54] PULSED ELECTRICAL ENERGY POWER SUPPLY

[75] Inventors: Serge Gidon, Tulette; Bernard Hennevin, Decines, both of France

[73] Assignee: Commissariat a l'Energie Atomique, France

[21] Appl. No.: 857,929
[22] PCT Filed: Nov. 22, 1990
[86] PCT No.: PCT/FR90/00839
  § 371 Date: May 18, 1992
  § 102(e) Date: May 18, 1992
[87] PCT Pub. No.: WO91/08605
  PCT Pub. Date: Jun. 13, 1991

[30] Foreign Application Priority Data

Nov. 23, 1989 [FR] France .............................. 89 15423

[51] Int. Cl.$^5$ .............................................. H01S 3/097
[52] U.S. Cl. ...................................... 323/282; 323/288; 323/351; 372/82
[58] Field of Search ................ 320/1; 323/282, 284, 323/288, 351; 372/82

[56] References Cited

U.S. PATENT DOCUMENTS

| | | | |
|---|---|---|---|
| 3,211,915 | 10/1965 | Poehlman et al. | 307/88 |
| 3,835,368 | 9/1974 | Williams | 323/282 |
| 4,016,461 | 4/1977 | Roland | 323/282 |
| 4,336,587 | 6/1982 | Boettcher, Jr. et al. | 363/134 |
| 4,378,586 | 3/1983 | Bete | 363/56 |
| 4,405,889 | 9/1983 | Overstreet et al. | 320/1 |
| 4,546,421 | 10/1985 | Bello et al. | 323/288 |
| 4,549,091 | 10/1985 | Fahlen et al. | 307/106 |
| 4,607,322 | 8/1986 | Henderson | 363/56 |
| 4,803,378 | 2/1989 | Richardson | 323/282 |
| 5,001,413 | 3/1991 | Ohms | 323/282 |
| 5,019,770 | 5/1991 | Harada et al. | 323/282 |
| 5,072,171 | 12/1991 | Eng | 323/288 |
| 5,079,689 | 1/1992 | Gidon et al. | 363/131 |
| 5,164,892 | 11/1992 | Kimbara | 323/224 |
| 5,192,906 | 3/1993 | Nathan | 323/284 |

FOREIGN PATENT DOCUMENTS

| | | | |
|---|---|---|---|
| 0226253 | 6/1987 | European Pat. Off. | H02J 7/10 |
| 1439680 | 7/1965 | France . | |
| 2575010 | 12/1984 | France | H03K 3/57 |
| 9108605 | 6/1991 | PCT Int'l Appl. | H02J 7/02 |
| 1107127 | 3/1968 | United Kingdom | H03K 1/02 |

OTHER PUBLICATIONS

J. Phys. E: Sci. Instrum 21 (Dec. 1988) pp. 388-392 Printed in the U.K. "Design and Performance of a 20 Watt Copper Vapour Laser" by: J. K. Mittal, P. K. Bhadani, B. Singh, L. Abhinandan and R. Bhatnagar.

J. Phys. E: Sci. Instrum 21 (Dec. 1988) pp. 218-224 Printed in the U.K. "An Efficient laser Pulser Using Ferrite Magnetic Switches" by: H. J. Baker, P. A. Ellsmore, E. C. Sille.

*Primary Examiner*—Jeffrey L. Sterrett
*Attorney, Agent, or Firm*—Hayes, Soloway, Hennessey, Grossman & Hage

[57] ABSTRACT

A pulse generator for supplying pulsed electrical energy from a charge stored in an accumulator is provided. The generator comprises a continuous electrical energy supply, an electrical energy accumulator, a switch for selectively connecting the supply means to the accumulator, and a switch control. The switch control compares voltages at the terminals of the accumulator with a given threshold voltage and controls the switch according to the comparison. An inductor for temporary accumulation of magnetic flux energy and a diverter for diverting excess electrical energy to an energy absorber for absorbing the excess energy also are provided. Particular utility is found in the area of supplying energy to a metal vapor laser, although other utilities are contemplated.

20 Claims, 4 Drawing Sheets

PULSED ELECTRICAL ENERGY POWER SUPPLY

BACKGROUND OF THE INVENTION

1. Field of the Invention

The present invention relates to an apparatus for charging electrical energy accumulation means. It more particularly applies to the production of a power generator intended for a pulse-type electrical supply of a metal vapor laser, e.g. a copper vapor laser.

2. Description of Related Prior Art

It is known that in a metal vapor laser and in particular in a copper vapor laser, a population inversion is obtained by exciting the vapor with high instantaneous power electrical discharges. The energy of these discharges comes from a power pulse generator having electrical energy accumulation means, which has a capacitor or a plurality of capacitors and previously are charged to a high electrical voltage.

The electrical energy accumulation means is associated with switching means by means of which it is discharged into the laser. The switching means can be associated with one or more magnetic compression stages making it possible to decrease the time width of the pulses reaching the laser.

A power pulse generator is described in article (1) by J. K. MITTAL et al entitled "Design And Performance Of A 20 Watt Copper Vapor Laser" and published in J. Phys. E. Sci. Instrum. 21, 1988, pp 388-392, to which reference will be made.

The generator described in said article has a capacitor 2 connected to the positive terminal of a D.C. voltage source 4 across an inductance coil 6 and a diode 8. On the one hand the inductance coil 6 is connected to the positive terminal of the source 4 and on the other to the anode of the diode 8, whose cathode is connected to a terminal of the capacitor 2.

The laser 10 to be supplied is installed between the other terminal of the capacitor 2 and the negative terminal of the source 4. Switching means incorporating a thyratron 12 is installed between the negative terminal of the source 4 and the connection between the capacitor 2 and the diode 8. A capacitor 14, called a picking capacitor and a shunt resistor 16 are fitted between the electrodes of the laser 10.

Other known generators have semiconductor switching devices (e.g. thyristors of the GTO type or transistors of the IGBT type).

In order to assist switching, it is also known to associate saturable magnetic elements (saturable inductance coils) with such semiconductor switching devices. In this connection reference can be made to article (2) by H. J. BAKER et al entitled "An Efficient Laser Pulser Using Ferrite Magnetic Switches" and published in J. Phys. E. Sci. Instrum. 21, 1988, pp 218-224.

Power pulse generators known from the state of the art are subject to instabilities, which lead to fluctuations in the energy of these pulses and therefore to fluctuations of the energy of the light pulses produced by the lasers.

These energy fluctuations are due to the variations in the recharging voltage of the electrical energy accumulation means. The voltage variations are due to fluctuations of the electrical energy absorbed by the laser associated with these accumulation means. This absorbed energy is significantly dependent on the discharge conditions in the vapor of the laser.

The electrical energy reflected at the laser "head" (vapor, enclosure containing the latter and discharge electrodes in the vapor) is in the form of a variable voltage at the terminals of the electrical energy accumulation means and which, during the following charging cycle, leads to the aforementioned fluctuations.

Thus, in the generator described in article (1), the recharging voltage v of the capacitor 2 following a discharge is equal to $2(v_1 - v_0)$, $v_1$ representing the supply voltage of the capacitor 2 and $v_0$ representing the "initial" voltage (i.e. the voltage after said discharge) at the terminals of the capacitor 2, $v_0$ being to the electrical energy reflected by the laser. It is the voltage $v_0$ and consequently the voltage v which fluctuate.

In the case of generators having semiconductor switching devices associated with saturable magnetic elements, said generators are also subject to instabilities causing a jitter, i.e., a time position instability of the electrical pulses supplied to the laser. This jitter is inadmissible during the placing in series of several lasers operating as amplifiers.

The aim of the present invention is to obviate the instability disadvantages suffered by the known generators for supplying metal vapor lasers and in particular copper vapor lasers, by solving the problem of controlling the electrical energy stored in the accumulation of said generators.

More generally, the invention aims at controlling the charge of the electrical energy accumulation means (e.g. a capacitor or group of capacitors connected in series or in parallel) taking account of a residual charge which said accumulation means may have after discharge.

U.S. Pat. No. 4,405,889 discloses a power supply intended for a repetitive discharge apparatus and FR-A-2 575 010 discloses a supply unit for an electric discharge pulsed laser.

SUMMARY OF THE INVENTION

The present invention relates to an apparatus for charging electrical energy accumulation means, said apparatus incorporating means for the continuous electrical supply of said accumulation means, switching means connecting the continuous electrical energy supply means to the electrical energy accumulation means and whose closure permits the charging of the latter, control means of the switching means, an inductive means for the temporary accumulation of magnetic energy and means for diverting an excess electrical energy, essentially of a magnetic origin and liable to appear in the apparatus during the charging of the accumulation means, to means able to absorb said excess electrical energy, characterized in that the switching means is directly controlled switching means for the opening and closing operations, in that the control means compares with a given voltage threshold the voltage at the terminals of the electrical energy accumulation means and control the opening of the switching means when the threshold is reached by said voltage at the terminals of the accumulation means and in that the apparatus comprises a transformer having a primary winding forming the inductive means and connected on the one hand to the switching means and on the other to the electrical energy accumulation means across a diode, which prevents the discharging of the latter to the continuous electrical supply means and a secondary winding for the evacuation of the excess electrical energy to the means able to absorb the latter across another diode, whose polarity permits said evacuation.

The term "diode" is understood to mean a means only allowing a current to pass in a single direction.

The invention also relates to an apparatus for charging electrical energy accumulation means, said apparatus having means for the continuous electrical supply of said accumulation means, switching means connecting the continuous electrical supply means to the electrical energy accumulation means and whose closure permits the charging of the latter, means for controlling the switching means, an inductive means for the temporary accumulation of magnetic energy and means for diverting an excess electrical energy, essentially of a magnetic origin and liable to appear in the apparatus during the charging of the accumulation means to means able to absorb said excess electrical energy, characterized in that the switching means are direct control switching means for the opening and closing operations, in that the control means are provided in order to compare with a given voltage threshold the voltage at the terminals of the electrical energy accumulation means and for controlling the opening of the switching means when the threshold is reached by said voltage at the terminals of the accumulation means and in that the apparatus also comprises means for the galvanic isolation of a load, which is supplied by the electrical energy accumulation means, with respect to the continuous electrical supply means and in that the inductive means comprises an inductance coil and the switching means comprises a first switch connected on the one hand to a first terminal of the continuous electrical supply means and on the other to the second terminal of the latter across a first diode and a second switch connected on the one hand to the means able to absorb the excess electrical energy across a second diode and on the other to the second terminal of the continuous electrical supply means, the first and second switches being simultaneously controlled by said control means, in that the galvanic isolation means comprises a transformer having primary winding and a secondary winding, in that the secondary winding is connected to the electrical energy accumulation means across a third diode preventing the discharge of the latter to the continuous electrical supply means and in that the primary winding is connected on the one hand to the connection between the first switch and the first diode and on the other hand both to the second terminal of the electrical supply means across a fourth diode and to the connection between the second switch and the second diode across said inductance coil, the respective polarities of the first, second and fourth diodes permitting the evacuation of the excess electrical energy.

The invention also relates to an apparatus for charging electrical energy accumulation means, said apparatus comprising means for the continuous electrical supply of said accumulation means, switching means connecting the continuous electrical supply means to the electrical energy accumulation means and whose closure permits the charging of the latter, means for controlling the switching means, an inductive means for the temporary accumulation of magnetic energy and means for diverting excess electrical energy, essentially of a magnetic origin and liable to appear in the apparatus during the charging of the accumulation means, to means able to absorb said excess electrical energy, characterized in that the switching means are direct control switching means for the opening and closing operations, in that the control means are provided for comparing with a given voltage threshold the voltage at the terminals of the electrical energy accumulation means and for controlling the opening of the switching means when the threshold is reached by said voltage at the terminals of said accumulation means, the apparatus also comprising means for the galvanic isolation of a load, which is intended to be supplied by the electrical energy accumulation means, with respect to the continuous electrical supply means and a transformer having a primary winding forming the inductive means and a secondary winding and in that the switching means comprises a first switch connected on the one hand to a first terminal of the continuous electrical supply means and on the other to the second terminal of the latter across a first diode and a second switch connected on the one hand to the first terminal of the continuous electrical supply means across a second diode and on the other to the second terminal of the continuous electrical supply means, the first and second switches being simultaneously controlled by said control means, in that the galvanic isolation means incorporates an auxiliary transformer having a primary winding and a secondary winding, in that the secondary winding of said auxiliary transformer is connected to the electric energy accumulation means across a third diode preventing the discharge of the latter towards the continuous electrical supply means, in that the primary winding of said auxiliary transformer is connected on the one hand to the connection between the first switch and the first diode and on the other to the connection between the second switch and the second diode across the primary winding of said transformer, in that the apparatus also comprises a fourth diode across which one terminal to the secondary winding of said transformer is connected to the means able to absorb the excess electrical energy and in that the other terminal of the secondary winding of the transformer is connected to the continuous electrical supply means, the respective polarities of the first, second and fourth diodes permitting the evacuation of the excess electrical energy.

In a particular embodiment of the invention facilitating the performance thereof, the means able to absorb the excess electrical energy is continuous electrical supply means, the latter having electrical energy storage means for recovering the excess electrical energy.

In this case, the means for diverting said excess electrical energy can cooperate with said continuous electrical supply means in such a way that the excess electrical energy is absorbed, as soon as it appears, by the latter.

The switching means can be semiconductor switching means.

Finally, the electrical energy accumulation means can be used for supplying the electricity to a metal vapor laser.

BRIEF DESCRIPTION OF THE DRAWINGS

The invention is described in greater detail hereinafter relative to non-limiting embodiments and with reference to the attached drawings, wherein.

DETAILED DESCRIPTION OF PREFERRED EMBODIMENTS

Figure 2:
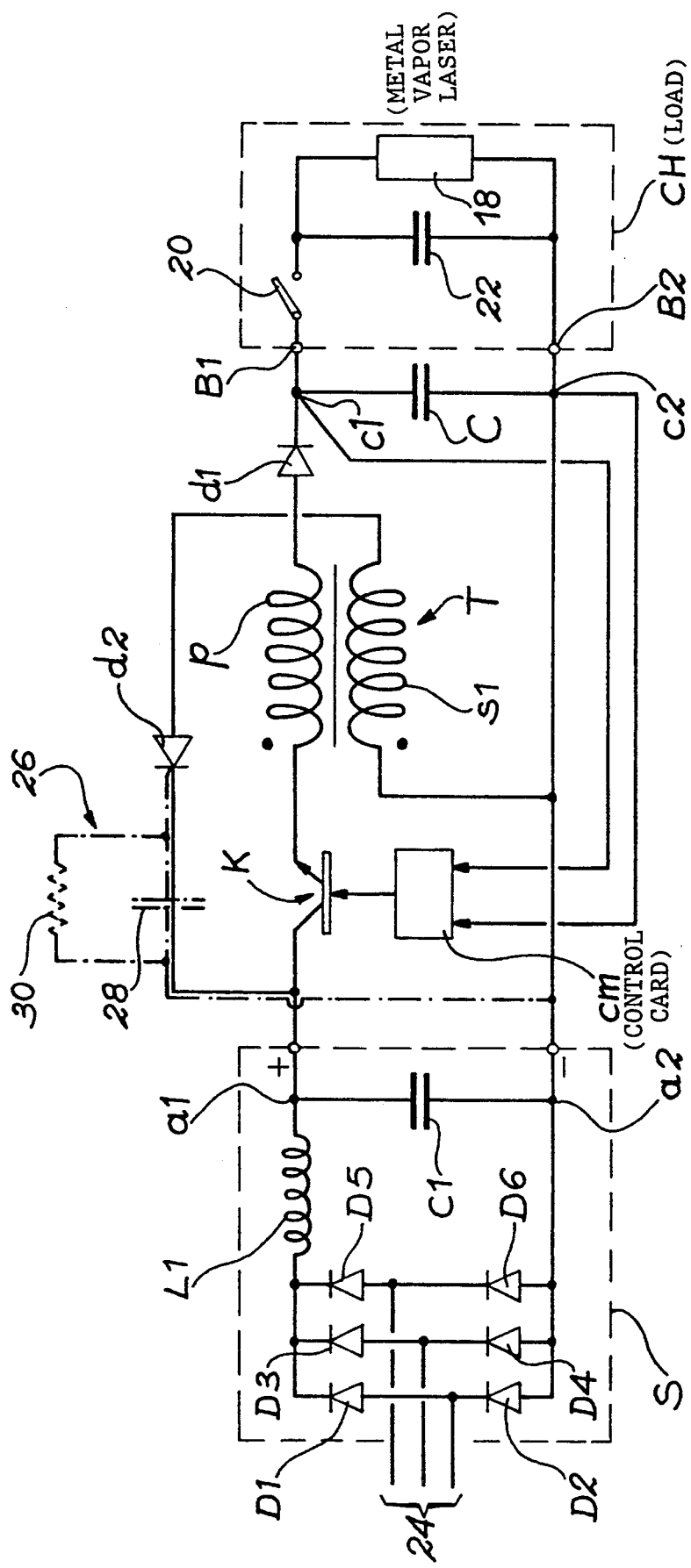
FIG. 2 is a diagrammatic view of a special embodiment of the apparatus according to the invention.

FIG. 2 diagrammatically shows an apparatus according to the invention and which charges in pulse-like manner electrical energy accumulation means C, e.g. constituted by a capacitor. The capacitor is charged by means of a D.C. voltage or power source S.

The capacitor C supplies the electrical power (which it stores) to a load CH. The terminals c1 and c2 of the 18 capacitor C are respectively connected to the terminals B1 and B2 of said load CH.

In a purely indicative and non-limiting manner, the capacitor C is used for the pulse-type electrical supply of a metal vapor laser 18 across a switch 20, which is e.g. a thyratron. The switch 20 is connected on the one hand to the terminal B1 and on the other to one of the terminals of the laser 18, whose other terminal is connected to the terminal B2. A picking capacitor 22 is also fitted between the terminals of the laser 18. Once the capacitor C is charged, it is discharged in pulse-like manner into the laser 18 across the switch 20.

In a purely indicative and non-limiting manner the source S for charging the capacitor C comprises six diodes D1 to D6, an inductance coil L11 and a capacitor C1. The cathodes of the diodes D2, D4 and D6 are respectively connected to the anodes of the diodes D1, D3 and D5, whose cathodes are connected to one terminal of the inductance coil L1. The other terminal of L1 is connected to a terminal a1 of the capacitor C1, whose other terminal a2 is connected to the anodes of the diodes D2, D4 and D6. The source S is supplied by the three-phase network 24 and the three conductors of the latter are respectively connected to the anodes of the diodes D1, D3 and D5. Thus, a D.C. voltage source S is provided, whose positive terminal corresponds to the terminal a1 of the capacitor C1 and whose negative terminal corresponds to the terminal a2 of said capacitor C1.

The apparatus according to the invention diagrammatically shown in FIG. 2 comprises a switch K, which is provided with an all or nothing control card cm, a transformer T, whose primary winding is designated p and whose secondary winding is designated s1, a diode d1 and a diode d2.

In an indicative, non-limiting manner, the switch K is a NPN-type IGBT transistor. The card cm is of the type used in cut-off electric supplies for controlling their power transistors.

The card cm has two inputs together forming a differential input and which are respectively connected to the terminals c1 and c2 of C. The card cm also has an output controlling the base of the transistor K. The collector of the transistor K is connected to the positive terminal of the source S. The emitter of transistor K is connected to a terminal of the primary winding p of the transformer T and the other terminal of said winding p is connected to the anode of the diode d1, whose cathode is connected to the terminal c1 of the capacitor C.

The negative terminal of the source S is connected to the terminal c2 of the capacitor C and to one terminal of the secondary winding s1 of the transformer T, the other terminal of said secondary winding s1 being connected to the anode of the diode d2, whose cathode is connected to the positive terminal of the source S.

Figure 1:
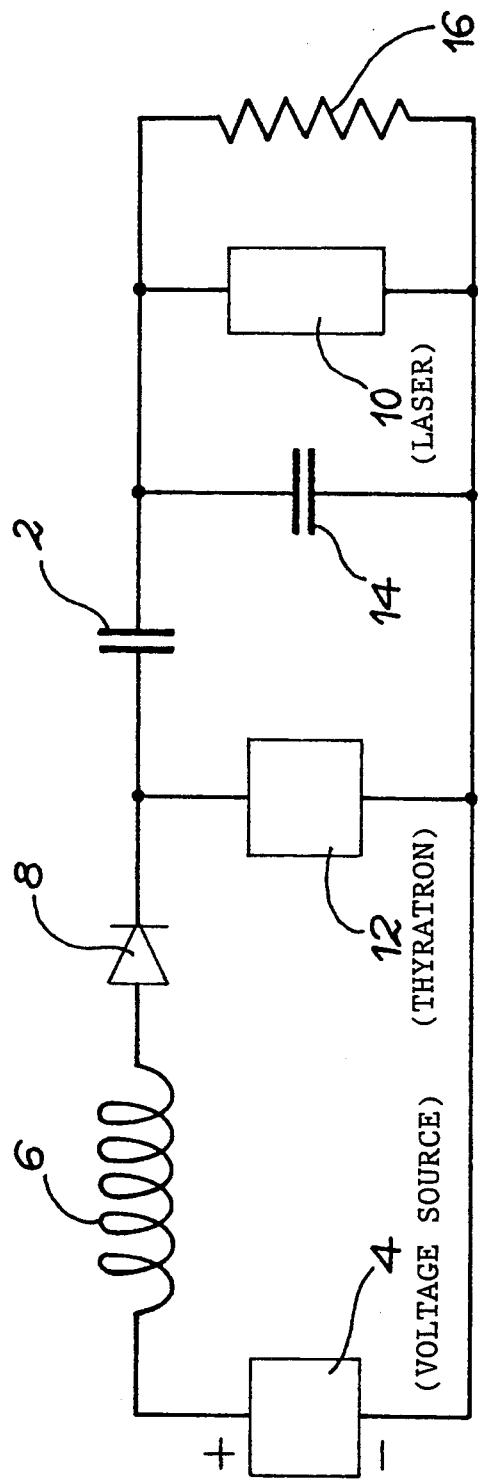
FIG. 1, already described, is a diagram of a known electric pulse generator.

It should be noted that the apparatus diagrammatically shown in FIG. 2 comprises magnetic elements including the primary winding p of the transformer T and which corresponds to the inductance coil 6 of FIG. 1 and fulfills the function of the latter. In the apparatus shown in FIG. 1, the transfer of electrical energy from the source 4 to the capacitor 2 takes place via the magnetic energy stored in the inductance coil 6.

In general, said magnetic energy is entirely used for supercharging the capacitor 2 above the voltage supplied by the source 4. Unfortunately this energy transfer is not controlled and is dependent on the initial charging state of the capacitor 2 (i.e. the charging state following the preceding discharge).

However, the apparatus diagrammatically shown in FIG. 2 makes it possible to obtain a stable voltage at the terminals of the capacitor C by diverting the excess energy of the magnetic elements of said apparatus and which in particular include the primary winding p to the D.C. voltage source or supply S or, in a varient which will be described hereinafter, to means able to absorb said excess energy.

The control card cm measures the voltage at the terminals of the capacitor C, compares it with a given threshold and controls the opening of the switch K when said threshold is reached.

More specifically, at the end of the preceding charging-discharging cycle, at the terminals of the capacitor C there is a residual voltage and the card cm detects that the voltage at the terminals of the capacitor C is below the given threshold (the latter exceeding the residual voltages which are liable to exist). The card cm then controls the closing of the switch K. Consequently the capacitor C is charged and as soon as the voltage at the terminals of the capacitor reaches the desired voltage (given threshold), this is detected by the card cm, which then controls the opening of the switch K (the excess energy available in the capacitor C1 used for charging the capacitor C then remaining in the capacitor C1).

However, during the opening of the switch K, energy is present in the transformer T and said energy must not pass to the capacitor C. This excess energy cannot be evacuated across the primary winding p of the transformer T because the switch K is open. It is therefore evacuated across the secondary winding s1 of the transformer T and the conductive diode d2 and consequently returns to the source S, where it is recovered by storage in the capacitor C1.

The evacuation of this magnetic excess energy is only possible if the coupling of the primary and secondary windings p, s1 in the transformer T is in the correct direction. This direction is indicated in conventional manner by dots in FIG. 2, to which reference should be made.

It should be noted that said excess energy is absorbed by the source S as soon as it appears in the apparatus. This also applies with respect to the apparatuses of FIGS. 3 and 5, where the excess energies appearing therein are absorbed by the source S as soon as they appear.

It is pointed out that the diode d1 of the apparatus of FIG. 2 is used for preventing the capacitor C discharging to the source S.

In a variant shown diagrammatically in mixed line form in FIG. 2, the excess energy is not evacuated to the source S and is instead evacuated to means 26 able to absorb said energy and having for this purpose a capacitor 28 and a resistor 30.

The apparatus is then modified in the following way. The cathode of the diode d2 is no longer connected to the positive terminal of the source S.

This cathode of the diode d2 is connected to a terminal of the capacitor 28, whose other terminal is connected to the negative terminal of the source S. The resistor 30 is fitted between the terminals of the capacitor 28, so that the excess energy absorbed by the means 26 is dissipated by said resistor 30 between two successive discharges of the capacitor C.

Obviously, an apparatus according to the invention would be obtained by reversing the polarities of the diodes d1 and d2 and that of the source S (the positive terminal then being connected to the terminal c2 and the negative terminal to the collector of the transistor K).

It should be noted that the apparatus shown in FIG. 2 and its variant shown in mixed line form therein do not permit galvanic isolation of the charge or load CH relative to the source S.

Instead of the switch K being in the form of an IGBT transistor, it could be a GTO thyristor, whose anode, cathode and gate would be respectively connected in the same way as the collector, emitter and base of the transistor.

Figure 3:
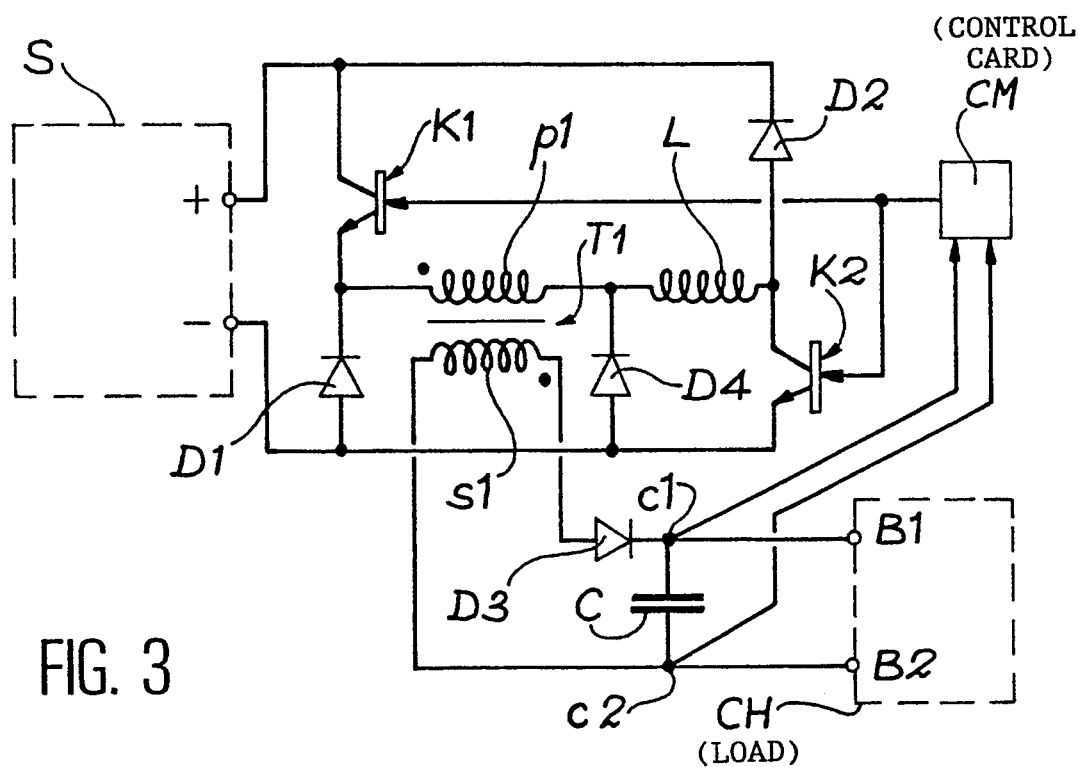
FIG. 3 is a diagrammatic view of another embodiment permitting the galvanic isolation of a charge and which is supplied by the accumulation means of the apparatus of FIG. 3 with respect to the D.C. power supply supplying said apparatus.

The apparatus according to the invention diagrammatically shown in FIG. 3 makes it possible to obtain such a galvanic isolation. This apparatus of FIG. 3 uses an asymmetrical H bridge.

The apparatus shown in FIG. 3 is used for charging a capacitor C, whose terminals c1 and c2 are respectively connected to the terminals B1 and B2 of the load CH. The apparatus of FIG. 3 has two switches K1 and K2 and a card CM for simultaneously controlling on an all or nothing basis said switches K1 and K2.

In a purely indicative and non-limiting manner, the two switches K1 and K2 are NPN-type IGBT transistors. The control card CM is of the type used in cut-off electric power supplies for controlling the power transistors thereof.

The card CM has two inputs and which together form a differential input and which are respectively connected to the terminals c1 and c2 of the capacitor C. The card CM also has an output controlling both the base of the transistor K1 and the base of the transistor K2.

The apparatus of FIG. 3 also has four diodes D1, D2, D3 and D4, a transformer T1, whose primary winding is designated p1 and whose secondary winding is designated s1, and an inductance coil L. One terminal of the secondary winding s1 is connected to the anode of the diode D3, whose cathode is connected to the terminal c1 of the capacitor C. The other terminal of the secondary winding s1 is connected to the terminal C2 of the said capacitor C.

The positive terminal of the source S is connected to the collector of the transistor K1 and to the cathode of said diode D2. The negative terminal of the source S is connected to the anode of the diode D1, to the anode of the diode D4 and to the emitter of the transistor K2.

The cathode of the diode D1 is connected to the emitter of the transistor K1 and to one terminal of the primary winding p1 of the transistor T1. The other terminal of said primary winding is connected to the cathode of the diode D4 and to one terminal of the inductance coil L, whose other terminal is connected to the anode of the diode D2 and to the collector of the transistor K2.

An explanation of the operation of the apparatus shown in FIG. 3 will now be given. When, during a preceding discharge, the capacitor C has supplied the energy which it contained to the load CH and now only has at its terminals a residual voltage, the latter is detected by the card CM, which then controls the simultaneous closure of the switches K1 and K2 enabling the source S to recharge the capacitor C across the transformer T1. The function of the diode D3 is to prevent the capacitor C from discharging towards the source S. The inductance coil L corresponds to the inductance coil 6 of FIG. 1.

The function of the transformer T1 is to ensure the galvanic isolation or separation of the load CH from the source S and also makes it possible to adapt the voltage of the source S to the voltage of the load CH by appropriately choosing the ratio of said transformer T1. It should be noted that in the apparatus of FIG. 3, the primary winding p1 of the transformer T1 only shows its leakage inductance.

When the voltage at the terminals of the capacitor C reaches the desired value (given threshold), it is detected by the card CM, which then simultaneously controls the openings of switches K1 and K2. There is then a flow of current, which is due to the excess energy in the inductance coil L, from the negative terminal to the positive terminal of the source S passing through D4, L and D2. There is also a current flow, due to the excess energy in the leakage inductance coil of the transformer T1, from the negative terminal to the positive terminal of the source S passing through D1, p1, L and D4. Therefore, these excess energies are supplied to the source S, where they are absorbed due to the capacitor C1.

Figure 4:
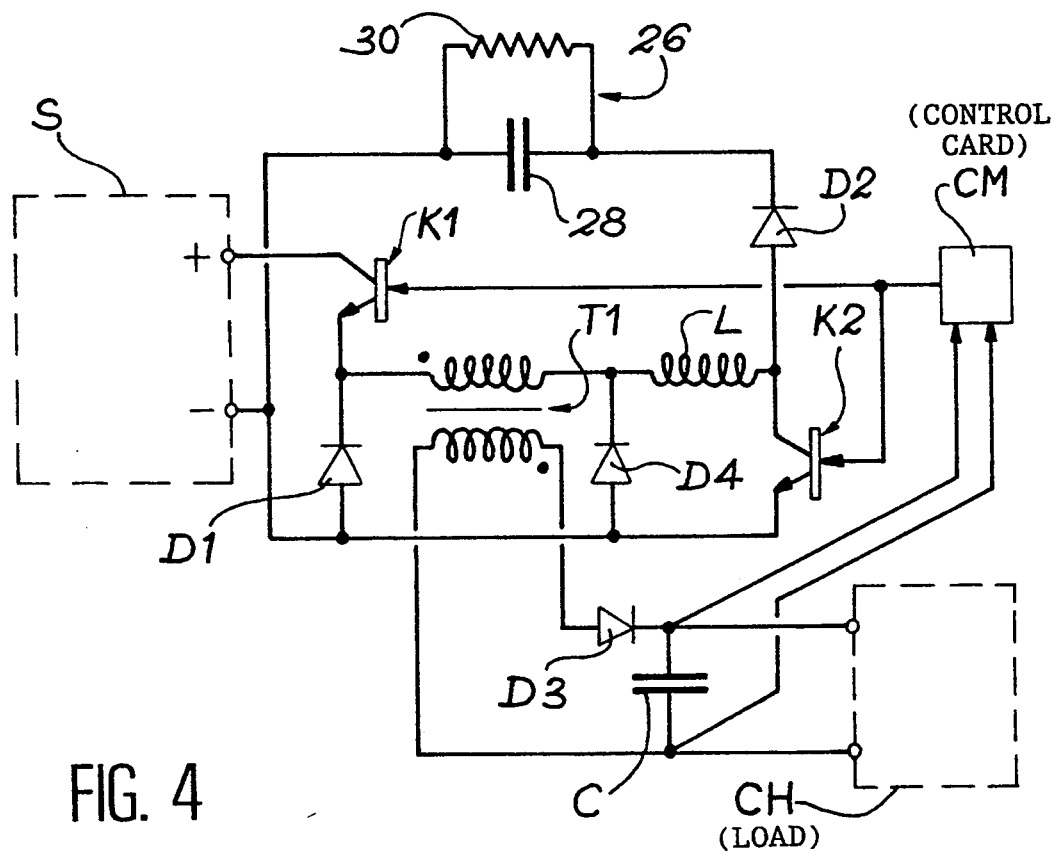
FIG. 4 diagrammatically shows a variant of the embodiment of the apparatus of FIG. 3.

FIG. 4 diagrammatically shows a variant of the apparatus of FIG. 3. In FIG. 4, the excess energy is no longer supplied to the source S, and instead is supplied to the aforementioned means 26. To this end, in the apparatus of FIG. 4, the cathode of the diode D2 is no longer connected to the positive terminal of the source S, but is instead connected to one terminal of the capacitor 28 of the means 26, whose other terminal is connected to the negative terminal of the source S. The electrical resistor 30 is fitted between the terminals of the capacitor 28.

Obviously, apparatuses according to the invention would be obtained by reversing, in the apparatuses of FIGS. 3 and 4, the polarities of the diodes D1, D2, D3 and D4 and the polarity of the source S (the positive terminal then being connected to the emitter of the transistor K2 and the negative terminal to the collector of the transistor K1).

For ensuring the operation of the apparatuses of FIGS. 3 and 4, the primary p1 and secondary s1 windings of the transformer T1 must be coupled in the correct direction and this is indicated by dots in FIGS. 3 and 4.

Figure 5:
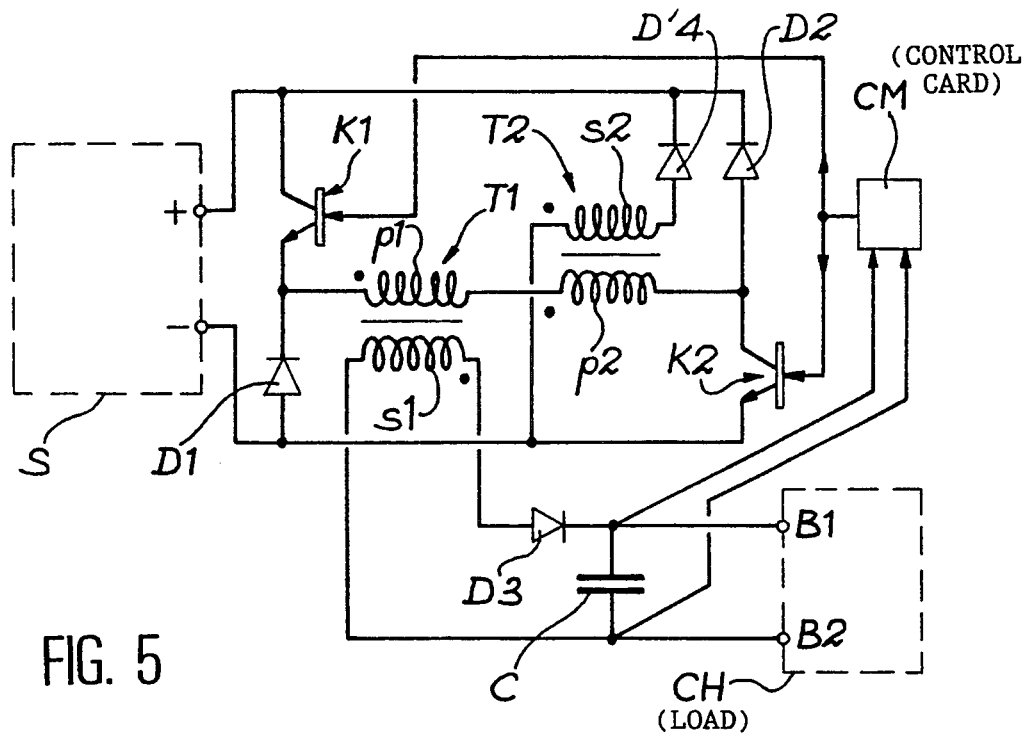
FIG. 5 is a diagrammatic view of another embodiment also permitting such a galvanic isolation.

FIG. 5 shows another apparatus according to the invention differing from that shown in FIG. 3 by the fact that the diode D4 and the inductance coil L are eliminated therein and the apparatus of FIG. 5 has two new elements, namely a supplementary transformer T2, whose primary winding is p2 and whose secondary winding is s2, together with a supplementary diode D'4.

One terminal of the secondary winding s2 of the transformer T2 is connected to the negative terminal of the source S and the other terminal of said winding s2 is connected to the anode of the diode D'4, whose cathode is connected to the positive terminal of the source S.

As hereinbefore, one terminal of the primary winding p1 of the transformer T1 is connected to the emitter of the transistor K1, but the other terminal of the winding p1 is connected to a terminal of the primary winding p2 of the transformer T2, the other terminal of said winding p2 being connected to the anode of the diode D2, said anode being connected to the collector of the transistor K2, as hereinbefore discussed. The transformer T2 has the same function as the transformer T in FIG. 2.

The secondary winding s2 of the transformer T2 permits the evacuation of the excess energy present in the magnetic circuit of the transformer T2 to the source S. The diodes D1 and D2 are used for restoring to the source S the energy stored in the leakage inductance coils of the transformers T1 and T2.

The apparatus shown in FIG. 5 has, compared with that shown in FIG. 3, the advantage of reducing the current stressing of the components of the apparatus by a larger excess energy transfer. Thus, in the case of FIG. 5, if the secondary winding s2 of the transformer T2 (demagnetization winding) has a transformation ratio below 1, it is possible to recover at the terminals of the primary winding p2 of the transformer T2 a voltage exceeding the voltage of the source S, which is impossible with the apparatus of FIG. 3.

Figure 6:
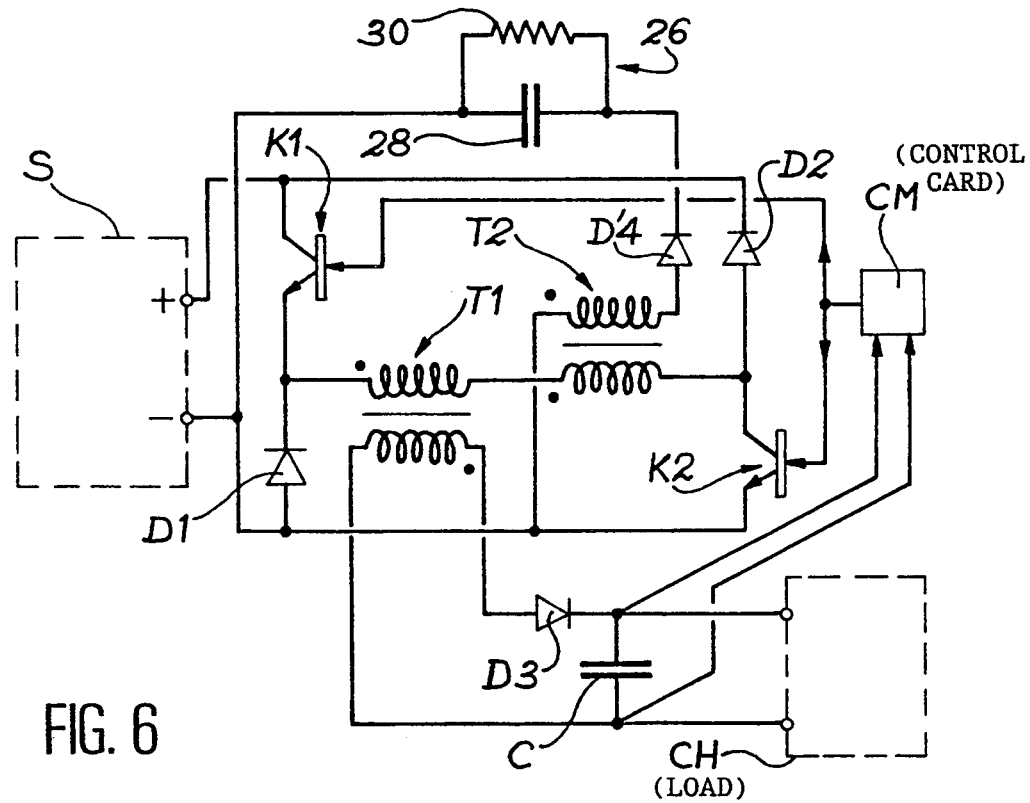
FIG. 6 diagrammatically shows a variant of the apparatus of FIG. 5.

The apparatus according to the invention and which is diagrammatically shown in FIG. 6 differs from that shown in FIG. 5 by the fact that the excess energy is no longer supplied to the source S and is instead diverted to the means 26 referred to hereinbefore and which absorbs said energy.

In the apparatus of FIG. 6, the diode D'4 is no longer connected to the positive terminal of the source S and is instead connected to one terminal of the capacitor 28 forming part of the means 26, the other terminal of capacitor 28 being connected to the negative terminal of the source S. As hereinbefore, the resistor 30 is connected between the terminals of the capacitor 28.

Obviously, apparatuses according to the invention would be obtained by reversing in the apparatuses of FIGS. 5 and 6 the polarities of the diodes D1, D2, D'3 and D4 and the polarity of the source S (the positive terminal being connected to the emitter of the transistor K2 and the negative terminal to the collector of the transistor K1).

The apparatuses of FIGS. 5 and 6 only function if the direction of the coupling of the primary p1 and secondary s1 windings of the transformer T1 and the coupling direction of the primary and secondary windings p2 s2 of the transformer T2 are correct. These directions are indicated by dots in FIGS. 5 and 6.

In order that the apparatuses shown in FIGS. 3, 4, 5, and 6 can precisely control the voltage at the terminals of the capacitor C, it is preferable for the transformer T1 to have a low leakage inductance and for the cabling of the elements connected to the secondary winding s1 of the transformer T1 to have a low inductance.

Obviously, the source S, whereof an embodiment has been given in illustrative manner hereinbefore, could be replaced in the apparatuses of FIGS. 2 to 6 by any other D.C. voltage source having electrical energy storage means able to recover the excess energy.

In place of an IGBT transistor, it would e.g. be possible to use as the switch K1 or K2 a GTO thyristor, whose anode, cathode and gate would be respectively connected in the manner of the collector, emitter and base of the transistor which it replaces.

We claim:

1. In a pulse generator for supplying pulsed electrical energy from a charge stored in an accumulation means (c), comprising, in combination, means (S) for continuous electrical supply of said accumulation means, switching means (K) for connecting the Continuous electrical supply means (S) to the electrical energy accumulation means (C) and whose closure permits charging of the accumulation means, means (cm) for controlling the switching means, an inductive means (p) for temporary accumulation of magnetic energy and means for diverting an excess electrical energy, essentially of a magnetic origin and liable to appear in the apparatus during charging of the accumulation means (C), to means (S, 26) for absorbing said excess electrical energy, to avoid sending said excess energy to the accumulation means, wherein the switching means is directly controlled switching means for opening and closing operations, the control means comparing with a given voltage threshold a voltage at terminals of the electrical energy accumulation means (C) to control opening of the switching means when the threshold is reached by said voltage at the terminals of the accumulation means and the apparatus also comprises a transformer (T) having a primary winding (p) forming the inductive means and connected to the switching means (K) and to the electrical energy accumulation means (C) across a diode (D1), which prevents discharging of the accumulation means to the continuous electrical supply means (S) and a secondary winding (s) for evacuation of the excess electrical energy to the means (S, 26) for absorbing said excess energy, said secondary winding being connected to said means for absorbing across another diode (D2), whose polarity permits said evacuation and to a terminal of the continuous electrical supply means.

2. In a pulse generator according to claim 1, wherein the switching means (K, K1, K2) comprises semiconductor switching means.

3. In a pulse generator according to claim 2, wherein the electrical energy accumulation means (C) supplies electrical power to a metal vapor laser (18).

4. In a pulse generator according to claim 1, wherein the means for absorbing the excess electrical energy comprises the continuous electrical supply means (S) and includes means (C1) for storage of electrical energy for recovering the excess electrical energy.

5. In a pulse generator according to claim 4, wherein the switching means (K, K1, K2) comprises semiconductor switching means.

6. In a pulse generator according to claim 4, wherein the electrical energy accumulation means (C) supplies electrical power to a metal vapor laser (18).

7. In a pulse generator according to 1, wherein the electrical energy accumulation means (C) supplies electrical power to a metal vapor laser (18).

8. In a pulse generator according to claim 1, wherein the means for absorbing the excess electrical energy comprises continuous electrical supply means (S) and includes means (C1) for storage of electrical energy for recovering the excess electrical energy and also wherein the means for diverting the excess electrical energy cooperates with the continuous electrical supply mean so that the excess electrical energy is absorbed by the supply means as soon as said excess energy appears.

9. In a pulse generator according to claim 8, wherein the switching means (K, K1, K2) comprises semiconductor switching means.

10. In a pulse generator according to claim 8, wherein the electrical energy accumulation means (C) supplies electrical power to a metal vapor laser (18).

11. In a pulse generator for supplying pulsed electrical energy from a charge stored in an accumulation means (c) comprising, in combination, means (S) for continuous electrical supply of said accumulation means, switching means (K1) for connecting the continuous electrical supply means (S) to the electrical energy accumulation means (C) and whose closure permits charging of the accumulation means, means (CM) for controlling the switching means, an inductive means for temporary accumulation of magnetic energy and means for diverting an excess electrical energy, essentially of a magnetic origin and liable to appear in the apparatus during charging of the accumulation means (C) to means (S, 26) for absorbing said excess electrical energy, to avoid sending said excess energy to the accumulation means, wherein the switching means is directly controlled switching means for opening and closing operations, the control means comparing with a given voltage threshold a voltage at terminals of the electrical energy accumulation means (C) to control opening of the switching means when the threshold is reached by said voltage at the terminals of the accumulation means, and the apparatus also comprises means (T1) for galvanic isolation of a load (CH), which is supplied by the electrical energy accumulation means (C), with respect to the continuous electrical supply means (S), the accumulation means being magnetically connected to the accumulation means, the inductive means comprises an inductance coil (L) and the switching means comprises a first switch (K1) connected to a first terminal of the continuous electrical supply means (S) and to a second terminal of the electrical supply means across a first diode (D1) and a second switch (K2) connected to the means (S, 26) for absorbing the excess electrical energy across a second diode (D2) and to the second terminal of the continuous electrical supply means (S), the first and second switches being simultaneously controlled by said control means, the galvanic isolation means comprises a transformer (T1) having a primary winding (p1) and a secondary winding (s1), the secondary winding is connected to the electrical energy accumulation means (C) across a third diode (D3) for preventing discharge of the accumulation means to the continuous electrical supply means (S) and the primary winding (p1) is connected to a connection between the first switch (K1) and the first diode (D1) and both to the second terminal of the continuous electrical supply means (S) across a fourth diode (D4) and to a connection between the second switch (K2) and the second diode (D2) across said inductance coil (L) #respective polarities of the first, second and fourth diodes permitting the evacuation of the excess electrical energy.

12. In a pulse generator according to claim 11, wherein the switching means (K, K1, K2) comprises semiconductor switching means.

13. In a pulse generator according to claim 11, wherein the means for absorbing the excess electrical energy comprises the continuous electrical supply means (S) and includes means (C1) for storage of electrical energy for recovering the excess electrical energy.

14. In a pulse generator according to claim 11, wherein the means for absorbing the excess electrical energy comprises continuous electrical supply means (S) and includes means (C1) for storage of electrical energy and for recovering the excess electrical energy and also wherein the means for diverting the excess electrical energy cooperates with the continuous electrical supply means so that the excess electrical energy is absorbed by the supply means as soon as said excess energy appears.

15. In a pulse generator according to claim 11, wherein the electrical energy accumulation means (C) supplies electrical power to a metal vapor laser (18).

16. In a pulse generator for supplying pulsed electrical energy from a charge stored in an accumulation means (c), comprising, in combination, means (S) for continuous electrical supply of said accumulation means, switching means (K1, K2) for connecting the continuous electrical supply means (S) to the electrical energy accumulation means (C) and whose closure permits charging of the accumulation means, means (CM) for controlling the switching means, an inductive means (p, L, p2) for temporary accumulation of magnetic energy and means for diverting excess electrical energy, essentially of a magnetic origin and liable to appear in the apparatus during charging of the accumulation means (C), to means (S, 26) for absorbing said excess electrical energy, to avoid sending said excess energy to the accumulation means, wherein the switching means is direct control switching means for opening and closing operations, the control means comparing with a given voltage threshold a voltage at terminals of the electrical energy accumulation means (C) to control opening of the switching means when the threshold is reached by said voltage at the terminals of said accumulation means, the apparatus also comprises means (T1) for galvanic isolation of a load (CH), which is intended to be supplied by the electrical energy accumulation means (C), with respect to the continuous electrical supply means (S), the accumulation means being magnetically connected to the accumulation means, and a transformer (T2) having a primary winding (p2) forming the inductive means and a secondary winding (s2) and the switching means comprises a first switch (K1) connected to a first terminal of the continuous electrical supply means (S) and to a second terminal of the supply means across a first diode (D1) and a second switch (K2) connected to the first terminal of the continuous electrical supply means (S) across a second diode (D2) and to the second terminal of the continuous electrical supply means (S), the first and second switches being simultaneously controlled by said control means, the galvanic isolation means incorporates an auxiliary transformer (T1) having a primary winding (p1) and secondary winding (s1), the secondary winding (s1) of said auxiliary transformer (T1) is connected to the electrical energy accumulation means (C) across a third diode (D3) for preventing discharge of the accumulation means to the continuous electrical supply means (S), the primary winding (p1) of said auxiliary transformer (T1) is connected to a connection between the first switch (K1) and the first diode (D1) and to a connection between the second switch (K2) and the second diode (D2) across the primary winding (p2) of said transformer (T2), the apparatus also comprises a fourth diode (D4) across which one terminal of the secondary winding (s2) of said transformer (T2) is connected to the means (S, 26) for absorbing the excess electrical energy and another terminal of the secondary winding (s2) of the transformer (T2) is connected to one terminal of the continuous electrical supply means (S), respective polarities of the first, second and fourth diodes permitting the evacuation of the excess electrical energy.

17. In a pulse generator according to claim 16, wherein the electrical energy accumulation means (C) supplies electrical power to a metal vapor laser (18).

18. In a pulse generator according to claim 16, wherein the switching means (K, K1, K2) comprises semiconductor switching means.

19. In a pulse generator according to claim 16, wherein the means for absorbing the excess electrical energy comprises the continuous electrical supply means (S) and includes means (C1) for storage of electrical energy and for recovering the excess electrical energy and also wherein the means for diverting the excess electrical energy cooperates with the continuous electrical supply means so that the excess electrical energy is absorbed by the supply means as soon as said excess energy appears.

20. In a pulse generator according to claim 16, wherein the means for absorbing the excess electrical energy comprises the continuous electrical supply means (S) and includes means (C1) for storage of electrical energy for recovering the excess electrical energy.

* * * * *

UNITED STATES PATENT AND TRADEMARK OFFICE
CERTIFICATE OF CORRECTION

PATENT NO. : 5,359,279
DATED : October 25, 1994
INVENTOR(S) : Gidon et al

It is certified that error appears in the above-indentified patent and that said Letters Patent is hereby corrected as shown below:

Claim 7, Col. 10, line 64, after "to" insert --claim--

Claim 8, Col. 11, line 6, "mean" should be --means--

Claim 11, Col. 11, line 65, delete "#" insert --,--

Signed and Sealed this

Fourteenth Day of November, 1995

Attest:

BRUCE LEHMAN

Attesting Officer    Commissioner of Patents and Trademarks